United States Patent [19]

Bose et al.

[11] 3,858,943

[45] Jan. 7, 1975

[54] APPARATUS FOR THE PRODUCTION AND PNEUMATIC CONVEYING OF A CONTINUAL FLOW OF PORTIONS OF LOOSE MATERIAL

[75] Inventors: Fritz-Rainer Bose, Braunschweig; Kurt Hornei, Stockheim Bei Braunschweig; Wolfgang Essmann, Braunschweig, all of Germany

[73] Assignee: MIAG Muehlenbau und Industrie GmbH

[22] Filed: Mar. 13, 1973

[21] Appl. No.: 340,829

[30] Foreign Application Priority Data
Mar. 16, 1972 Germany.......................... 2212611

[52] U.S. Cl.................... 302/26, 222/373, 302/41, 302/53
[51] Int. Cl. .......................................... B65g 53/12
[58] Field of Search ..... 222/373; 302/26, 41, 53–55

[56] References Cited
UNITED STATES PATENTS

| | | | |
|---|---|---|---|
| 1,308,464 | 7/1919 | Westly | 302/26 |
| 2,891,782 | 6/1959 | Blackman et al. | 302/53 X |
| 3,175,735 | 3/1965 | Hathorn | 302/48 X |
| 3,604,758 | 9/1971 | Flain et al. | 302/26 X |
| 3,671,078 | 6/1972 | Wise | 302/28 |
| 3,671,079 | 6/1972 | Huffaker | 302/55 X |

FOREIGN PATENTS OR APPLICATIONS
633,550  10/1963  Belgium.............................. 222/373

*Primary Examiner*—Evon C. Blunk
*Assistant Examiner*—W. Scott Carson
*Attorney, Agent, or Firm*—Hill, Gross, Simpson, Van Santen, Steadman, Chiara & Simpson

[57] ABSTRACT

Pnuematic conveyor device for loose material, continuously conveying the loose material in slugs. The device includes a storage tank having an inlet for loose material into the top thereof and having a converging bottom. Air is admitted to the tank through the top of the tank. A loose material inlet leads into the top of the tank under the control of a solenoid controlled valve. An air outlet leads from the top of the tank and to a feeder starting chamber. A control valve controls the flow of air to the feeder starting chamber. A feeder valve is located in a line leading from the bottom of the tank to the feeder starting chamber. The control valve in the air line and the feeder valve are alternately operable in a predetermined sequence to effect the conveying of slugs of loose material of equal size, separated by air buffers from the feeder starting chamber along a conveyor line at the same rates of speed.

7 Claims, 1 Drawing Figure

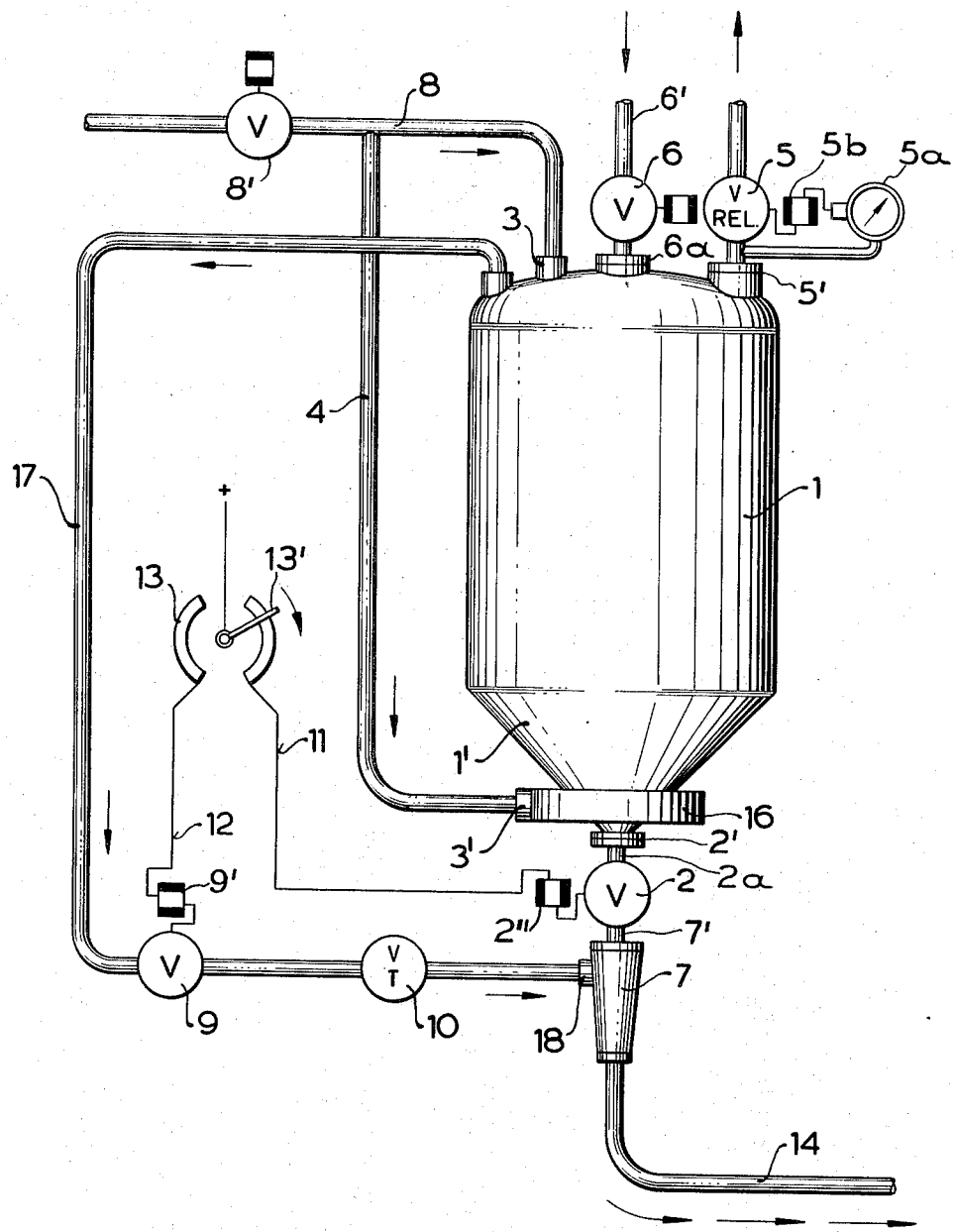

APPARATUS FOR THE PRODUCTION AND PNEUMATIC CONVEYING OF A CONTINUAL FLOW OF PORTIONS OF LOOSE MATERIAL

FIELD OF THE INVENTION

Pneumatic conveyor for the continuous and uniform conveying of loose material along a conveyor line in slugs separated by air buffers.

BACKGROUND, SUMMARY AND ADVANTAGES OF THE INVENTION

The pneumatic conveyor of the present invention differs from pneumatic conveyors heretofore known in that it conveys the loose material in slugs of equal size separated by air buffers at constant rates of speed under the control of a series of alternately operable conveying medium and loose material supply valves, and is particularly suitable for conveying mixed loose material tending to separate into its component parts.

In known pneumatic conveying devices, the storage container and starting chamber are connected in a parallel circuit with the feeding means for the conveying medium. During operation of this device, the pressure differences between the storage container and the starting chamber fluctuate to a considerable extent, since upon opening of the valve supplying material to the starting chamber, the amount of material delivered from the starting chamber is dependent on this pressure difference. With fluctuating pressures, different amounts of material and corresponding different conveying speeds result and slugs of different sizes and flowing at different speeds are conveyed from the starting chamber along the conveyor line.

It is a prerequisite to efficient conveying of material tending to mix that the slugs be of equal size and pass from the starting chamber at equal intervals separated by air buffers and pass along the conveyor line at the same speeds, particularly where the slugs are to be further processed or packaged. The known pneumatic conveying devices were, therefore, not sufficient for the conveying of material which must be further processed. The present invention thus cures these deficiencies by maintaining the pressure differences between the storage container and starting chamber substantially constant.

The conveyor includes a storage container having a loose material supply line leading into the top of the container, in which the supply of loose material is controlled by a solenoid operated valve. A feeder starting chamber is disposed beneath the converging bottom of the storage container in series therewith and is supplied with loose material under the control of a feeder valve. The pneumatic conveying means, which may be air, leads into the top of the storage container and leads from the top of the container alongside of the container to the feeder starting chamber and has a control valve and a variable volume flow control valve therein to suit the air pressure to the material conveyed. The feeder valve and control valve for the air under pressure are alternately operated for equal intervals, so that one valve is opened while the other closes. When the feeder valve is open, loose material enters the starting chamber from the bottom of the storage container. As soon as the feeder valve is closed, the control valve will open and force the loose material present in the starting chamber through the conveyor line by air under pressure. The valves are operated by sequence switching, to deliver equal volumes of material to the starting chamber, and to convey equal lengths of the material along the conveyor line at constant speeds, spaced apart by air buffers in the conveyor line.

The advantages of the present invention over the known pneumatic conveying devices are that fluctuations in pressure are avoided and the slugs or portions of material conveyed are of equal sizes and travel at the same speed separated by air buffers.

A further advantage of the invention is that the supply of material from the storage container to the starting chamber and the supply of conveying medium to the starting chamber are switched in a predetermined sequence to deliver equal length slugs of material at the same speeds separated by air buffers in contrast to known pneumatic conveying devices.

A still further advantage of the invention is that the flow of air may be varied by operation of a flow control valve to suit a particular consistency of material to be conveyed at a preselected speed.

A further advantage of the present invention is that the arrangement of the device to maintain a substantially constant pressure difference between the storage container and starting chamber which may be adjustable, by arranging the feeder beneath and in series with the storage container and in series with the conveyor feed line.

A further advantage of the invention is in the converging bottom of the storage container accommodating complete emptying of the storage container in a simplified manner.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

The one sheet of drawings illustrates one embodiment of a pneumatic conveyor constructed in accordance with the principles of the present invention.

DESCRIPTION OF PREFERRED FORM OF INVENTION

In the embodiment of the invention illustrated in the drawing, a storage container 1 for loose materials is shown as being in the form of a tank having a dome-like top and a converging inverted frusto-conical bottom 1'. The reduced end portion of the bottom 1' has connection with a feeder valve 2 through a flanged coupling 2' and conduit 2a. The feeder valve 2 in turn has connection with a feeder starting chamber 7 through the top thereof through a conduit 7'. The feeder starting chamber 7 may be of a conventional form and is no part of the present invention so need not herein be described further. Said feeder starting chamber has an inlet fitting 18 leading into the wall thereof adjacent the top portion thereof for admitting the conveyor means, such as compressed air, thereto.

The storage container 1 has a conduit 8 for the conveyor means, such as compressed air, leading into the top thereof through a conveyor means supply fitting 3, under the control of a valve 8' in the conveyor means supply line 8.

A loose material supply line 6' leads into the top of the storage container 1 through a sealed connector 6a under the control of a valve 6 which may be in the form of a solenoid controlled valve suitable for admitting loose material into the storage container 1. A fitting and conduit 5' leads from the top of the tank 1 and has communication with a pressure regulator 5 for regulating the pressure of the conveying medium in the tank 1. The pressure regulator valve 5 may be solenoid operated under the control of a gauge 5a adapted to energize a solenoid coil 5b to open the pressure regulator upon preselected pressure conditions.

A conduit 17 for air under pressure leads from the top of the storage container 1 downwardly along said storage container along the outside thereof and has communication with the conveyor means supply fitting 18 leading into the feeder starting chamber 7. A control valve 9 is provided in said conduit. The control valve 9 may be a conventional form of solenoid operated air control valve and is energizable by operation of an intermittently operable sequence switch 13 having a switch arm 13', which may be rotatably moved by power at a constant speed in any suitable manner, to complete an energizing circuit to a solenoid coil 2'' to open the feeder valve 2, and then to a solenoid coil 9' to open the control valve 9, when the feeder valve 2 is closed. An adjustable throttle valve 10 is provided in the air line 17, between the control valve 9 and the feeder starting chamber 7 to adjust the pressure of the conveyor agent or air to a required preselected pressure to suit the pressure for different materials and thereby accurately adjust the pressure to the material in the starting chamber 7. The valve 10 may be manually adjusted and change the pressure between the storage container and starting chamber 7, as required.

In operation of the conveyor, the storage container 1 is first filled with loose material through the supply line 6' under the control of the valve 6. When the storage container is full, the valve 6 is closed. The conveyor means or agent such as air under pressure, is supplied to the storage container 1 through the compressed air supply line 8 under control of the valve 8' and increases the pressure in said storage chamber under the control of the pressure regulator 5. Air under pressure will then pass out of the storage chamber 1 through the conveyor agent or air line 17 to the control valve 9.

When the control valve 9 is closed, the feeder valve 2 will be open under the control of the switch 13. A portion of the loose material in the storage container 1 will then pass from the bottom of the storage container into the feeder starting chamber 7. As the valve closes, the switch arm 13' will have moved into position to energize the solenoid coil 9' of the valve 9 and open said valve. The conveyor agent such as air under pressure, will then force the loose material to pass from the feeder starting chamber 7 into and along the conveyor line 14 in the form of a slug separated by air buffers. The operation of opening and closing the valves 2 and 9 will thus be an intermittent operation first admitting loose material into the feeder starter chamber 7 under the control of the feeder valve 2 and then discontinuing the flow of loose material into the feeder starting chamber 7 and admitting air under pressure to said feeder starting chamber to force the loose material in said feeder starting chamber along the conveyor line 14. The system disclosed thus forces one slug of loose material after the other into the conveyor line 14, with the slugs separated from each other by means of air buffers formed by the conveying agent, to force the loose material along said conveyor line.

Moreover, by adjusting the throttle valve 10, the pressure of air may be varied to deliver the required slugs separated by air buffers along the conveyor line 14, assuring a continuous conveying of the slugs along said conveyor line at uniform speeds and thereby retaining the slugs in their initial form as they pass along said conveyor line.

A throttle 16 in the form of an air distributor extends about the converging end portion of the storage container 1 adjacent the bottom thereof and is connected with the compressed air line 8 through a branch line 4 connected with said throttle through a fitting 3'. The throttle 16 admits air to the converging or funnel-like bottom of the storage container 1 and serves to loosen the loose material in the converging bottom of said storage chamber to enable complete emptying of the storage container 1. The throttle is only diagrammatically shown herein and may be in the form of an annular chamber having radial orifices or holes leading into the storage container 1, throughout the circumferential portion of the inverted conical bottom thereof. The orifices may be inclined to direct air upwardly along the inclined inner wall and thereby improve the loosening effect of the loose material in the storage container. The throttle may be adjustable, if required. This throttle is extremely important where the mixed material may be food, pharmaceutical material, poison material and similar goods. The supply of the conveyor means, such as air, to the storage container at 3' has the advantage of a short conveyor line between the storage container and starting chamber. In many cases, air may be supplied to the storage container through the fitting 3' rather than the fitting 3 at the top of the storage container and thereby shorten the conveyor line between the storage container and the starting chamber.

We claim as our invention:

1. In a pneumatic conveying device for conveying slugs of loose material with air buffers therebetween,
   a storage container,
   an inlet for loose material leading through the top of said storage container,
   a valve controlling the supply of loose material through said inlet,
   an inlet for air under pressure leading into said storage container,
   a valve controlling the flow of air into said storage container,
   a pressure regulating valve regulating the pressure of air in said storage container,
   a feeder line for loose material leading from the bottom of said storage container and having a feeder valve therein,
   a feeder starting chamber downstream of said feeder valve connected with said storage container through said feeder valve,
   a loose material conveyor line leading from said feeder starting chamber,
   a pressure line for air under pressure leading from said storage container to said feeder starting chamber and supplying air under pressure from said storage container to said starting chamber at the pressure of air in said storage container and assuring that air under pressure first flows through said storage container before passing to said starting chamber, an air control valve in said pressure line controlling the flow of air under pressure from said storage container to said starting chamber, and means alternately operating said feeder valve and said air control valve, for admitting slugs of loose material into said feeder starting chamber and forcing slugs of loose material from said feeder starting chamber along said conveyor line with air buffers between the slugs passing along said conveyor line.

2. The apparatus of claim 1, wherein said control valve and said feeder valve are solenoid operated and a switch is provided to alternately operate said valves.

3. The apparatus of claim 2,
wherein the switch is a sequence timer switch and has two contacts, one operable to energize the solenoid for operating said feeder valve and the other operable to energize the solenoid for opening the control valve, and
wherein a rotatable switch arm alternately engages said contacts.

4. The apparatus of claim 3, wherein an adjustable flow control valve is provided in said pressure line to said starting chamber between said control valve and starting chamber, to adjust the pressure of air supplied to said starting chamber for different materials to be conveyed.

5. The apparatus of claim 1, wherein an adjustable flow control valve is provided in said pressure line to said starting chamber between said control valve and starting chamber to enable the pressure of air to be varied to suit the material conveyed.

6. The apparatus of claim 1,
wherein the storage container has a converging frusto-conical bottom,
wherein an air distributing means extends about said bottom and has communication therewith, and
wherein a branch air supply line leads to said air distributing means to supply air under pressure to said storage container along the frusto-conical interior portion thereof.

7. The apparatus of claim 1, wherein a variable pressure relief valve leads from said storage container and is operable to vary the pressure therein and relieve the pressure at predetermined excess pressures.

* * * * *